(12) United States Patent
Yoon

(10) Patent No.: US 7,864,256 B2
(45) Date of Patent: Jan. 4, 2011

(54) LIQUID CRYSTAL DISPLAY AND METHOD OF MANUFACTURING THEREOF

(75) Inventor: Joo-Sun Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/541,650

(22) Filed: Aug. 14, 2009

(65) Prior Publication Data

US 2009/0296012 A1    Dec. 3, 2009

Related U.S. Application Data

(63) Continuation of application No. 11/691,111, filed on Mar. 26, 2007, now Pat. No. 7,589,801.

(30) Foreign Application Priority Data

Jun. 15, 2006    (KR) .................. 10-2006-0053853

(51) Int. Cl.
*G02F 1/136* (2006.01)
*G02F 1/1335* (2006.01)

(52) U.S. Cl. ...................... 349/43; 349/114
(58) Field of Classification Search .......... 349/114
See application file for complete search history.

(56) References Cited

U.S. PATENT DOCUMENTS

| | | | |
|---|---|---|---|
| 6,704,068 B2 | 3/2004 | Murade | |
| 6,879,369 B2 | 4/2005 | Lee et al. | |
| 6,897,932 B2 | 5/2005 | Murade et al. | |
| 2002/0038998 A1* | 4/2002 | Fujita et al. | 313/495 |
| 2003/0103181 A1 | 6/2003 | Imayama et al. | |
| 2004/0125325 A1* | 7/2004 | Murai et al. | 349/187 |
| 2007/0064185 A1* | 3/2007 | Kim et al. | 349/114 |
| 2008/0123008 A1 | 5/2008 | Yoshii | |
| 2010/0072503 A1* | 3/2010 | Nakagawa | 257/98 |

FOREIGN PATENT DOCUMENTS

| | | |
|---|---|---|
| CN | 1577027 | 2/2005 |
| JP | 2002-090720 | 3/2002 |
| JP | 2004-258626 | 9/2004 |
| JP | 2005-077475 | 3/2005 |
| JP | 2005-236191 | 9/2005 |
| KR | 1020040009901 | 1/2004 |
| KR | 1020050097580 | 10/2005 |
| KR | 1020060016881 | 2/2006 |

* cited by examiner

*Primary Examiner*—Uyen-Chau N Le
*Assistant Examiner*—Chris H Chu
(74) *Attorney, Agent, or Firm*—F. Chau & Associates, LLC

(57) ABSTRACT

A display device includes a thin film transistor (TFT) substrate, a countering substrate facing the TFT substrate, a sealant, and a liquid crystal layer interposed between the TFT substrate and the countering substrate. The TFT substrate includes a substrate having a display area and a peripheral area, a first TFT formed in the peripheral area and including a semiconductor layer and a resistive contact member formed on the semiconductor layer, a light blocking semiconductor pattern, a second TFT formed in the display area and including a gate electrode. The sealant couples the TFT substrate to the countering substrate, and covers the first TFT.

12 Claims, 7 Drawing Sheets

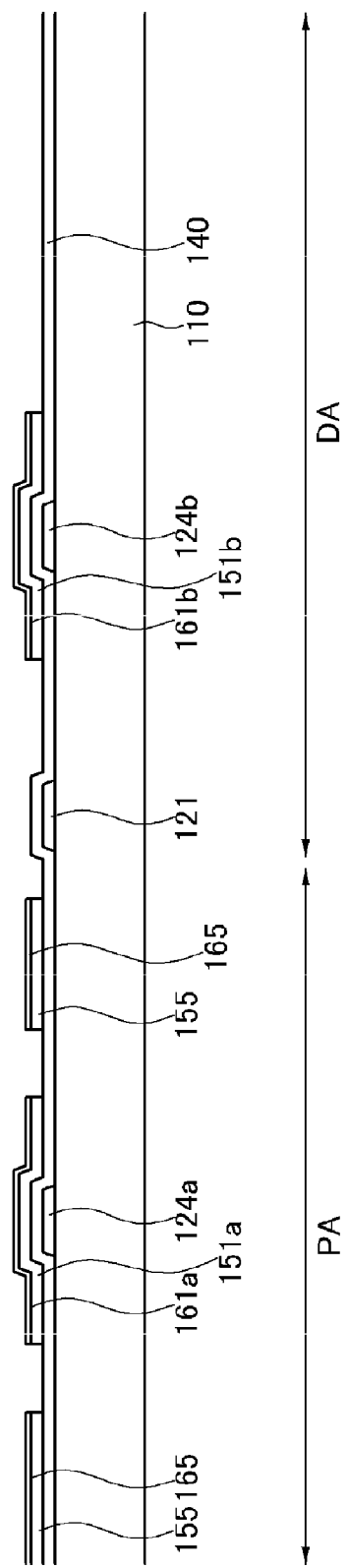

(12) United States Patent

LIQUID CRYSTAL DISPLAY AND METHOD OF MANUFACTURING THEREOF

CROSS-REFERENCE TO RELATED APPLICATIONS

This is a continuation of U.S. application Ser. No. 11/691,111 filed on Mar. 26, 2007 now U.S. Pat. No. 7,589,801, which claims priority under 35 U.S.C. §119 to Korean Patent Application No. 2006-53853 filed on Jun. 15, 2006, contents of both are hereby incorporated by reference in their entirety.

BACKGROUND OF THE INVENTION

1. Technical Field

The present disclosure relates to a liquid crystal display and a method of manufacturing the liquid crystal display, and more particularly, to a liquid crystal display having an enhanced display quality.

2. Discussion of the Related Art

A liquid crystal display (LCD) is a commonly used flat panel display. The LCD includes two substrates with electrodes and a liquid crystal layer interposed between the two substrates. By applying voltages to the electrodes and rearranging liquid crystal molecules of the liquid crystal layer, the amount of light transmitted through the two substrates can be adjusted.

The LCD includes a thin film transistor (TFT) substrate having a plurality of pixel electrodes in a matrix in a display area and a countering substrate having a common electrode which is formed on a surface of the countering substrate. Each of the pixel electrodes receives driving voltages so that images are displayed. The TFT substrate includes pixel TFTs connected to each of the pixel electrodes to switch driving voltages applied to the pixel electrodes, a plurality of gate lines transmitting signals to control the pixel TFTs and a plurality of data lines transmitting driving voltages to the pixel electrodes. The pixel TFTs can transmit or block image signals transmitted through the plurality of data lines in response to a gate signal. The gate signal is transmitted through the plurality of gate lines from a gate driver IC disposed in a peripheral area surrounding the display area.

Manufacturing efficiency can be improved by integrating a gate driving circuit including a driving TFT on the TFT substrate. When images are displayed, a portion of light generated from a backlight assembly passes through the peripheral area and is reflected from the countering substrate. Then, the reflected light may impinge upon the driving TFT.

Since the driving TFT is sensitive to light, the reflected light impinging upon the driving TFT may adversely affect the operation of the driving TFT.

SUMMARY OF THE INVENTION

Exemplary embodiments of the present invention provide a liquid crystal display capable of enhancing display quality, and a method of manufacturing the liquid crystal display.

According to an exemplary embodiment of the present invention, a display device includes a thin film transistor (TFT) substrate, a countering substrate facing the TFT substrate, a sealant, and a liquid crystal layer interposed between the TFT substrate and the countering substrate. The TFT substrate may include a substrate having a display area and a peripheral area, a first TFT formed in the peripheral area and having a semiconductor layer and a resistive contact member formed on the semiconductor layer, a light blocking semiconductor pattern, a second TFT formed in the display area and having a gate electrode. The sealant couples the TFT substrate to the countering substrate, and covers the first TFT.

The display device may further comprise a resistive contact pattern formed on the light blocking semiconductor pattern and can be formed simultaneously with the resistive contact member.

The first TFT may further comprise a source electrode and a drain electrode formed on the semiconductor layer, and a connection part connecting the drain electrode with a gate line. The source electrode and the drain electrode can be spaced apart from the light blocking semiconductor pattern by a predetermined distance. The light blocking semiconductor pattern may have hydrogenated amorphous silicon, and/or crystalline silicon. The sealant may cover at least a portion of the light blocking semiconductor pattern.

According to an exemplary embodiment of the present invention, a method of manufacturing a display device includes forming a thin film transistor (TFT) substrate having a display area and a peripheral area, forming a first gate electrode in the display area and a second gate electrode in the peripheral area, forming a semiconductor layer and a resistive contact member on the first gate electrode and the second gate electrode, forming a first semiconductor layer and a first resistive contact member on the first gate electrode by patterning the resistive contact member and the semiconductor layer, forming a light blocking semiconductor pattern and a resistive contact pattern in the peripheral area, forming a conductive layer on the first resistive contact member, forming a first source electrode and a first drain electrode by patterning the conductive layer, and forming a sealant interposed between the TFT substrate and the countering substrate, wherein the sealant covers the first semiconductor layer.

When the first semiconductor layer and the first resistive contact member are formed, a second semiconductor layer and a second resistive contact member can be formed.

When the first source electrode and the first drain electrode are formed, a second source electrode and a second drain electrode may be formed.

The method of manufacturing the display device may further comprise forming a passivation layer having a first contact hole to expose the first drain electrode and a second contact hole to expose a gate line and forming a connection part connecting the first drain electrode with the gate line.

When the first source electrode and the first drain electrode are formed, the first source electrode and the first drain electrode can be spaced apart from the light blocking semiconductor pattern by a predetermined distance, and a light blocking metal layer may be formed on the light blocking semiconductor pattern. The light blocking metal layer can have substantially the same material as a material of the source electrode and the drain electrode.

The light blocking semiconductor pattern may have hydrogenated amorphous silicon, and/or crystalline silicon. The sealant may cover at least a portion of the light blocking semiconductor pattern.

BRIEF DESCRIPTION OF THE DRAWINGS

Exemplary embodiments of the present invention can be understood in more detail from the following descriptions taken in conjunction with the accompanying drawings, in which:

FIG. 2a to FIG. 2e are cross-sectional views for showing a method of manufacturing a display device in accordance with an exemplary embodiment of the present invention.

DESCRIPTION OF THE EXEMPLARY EMBODIMENTS

Exemplary embodiments of the present invention will be described below in more detail with reference to the accompanying drawings. The present invention may, however, be embodied in many different forms and should not be construed as limited to the exemplary embodiments set forth herein.

Figure 1:
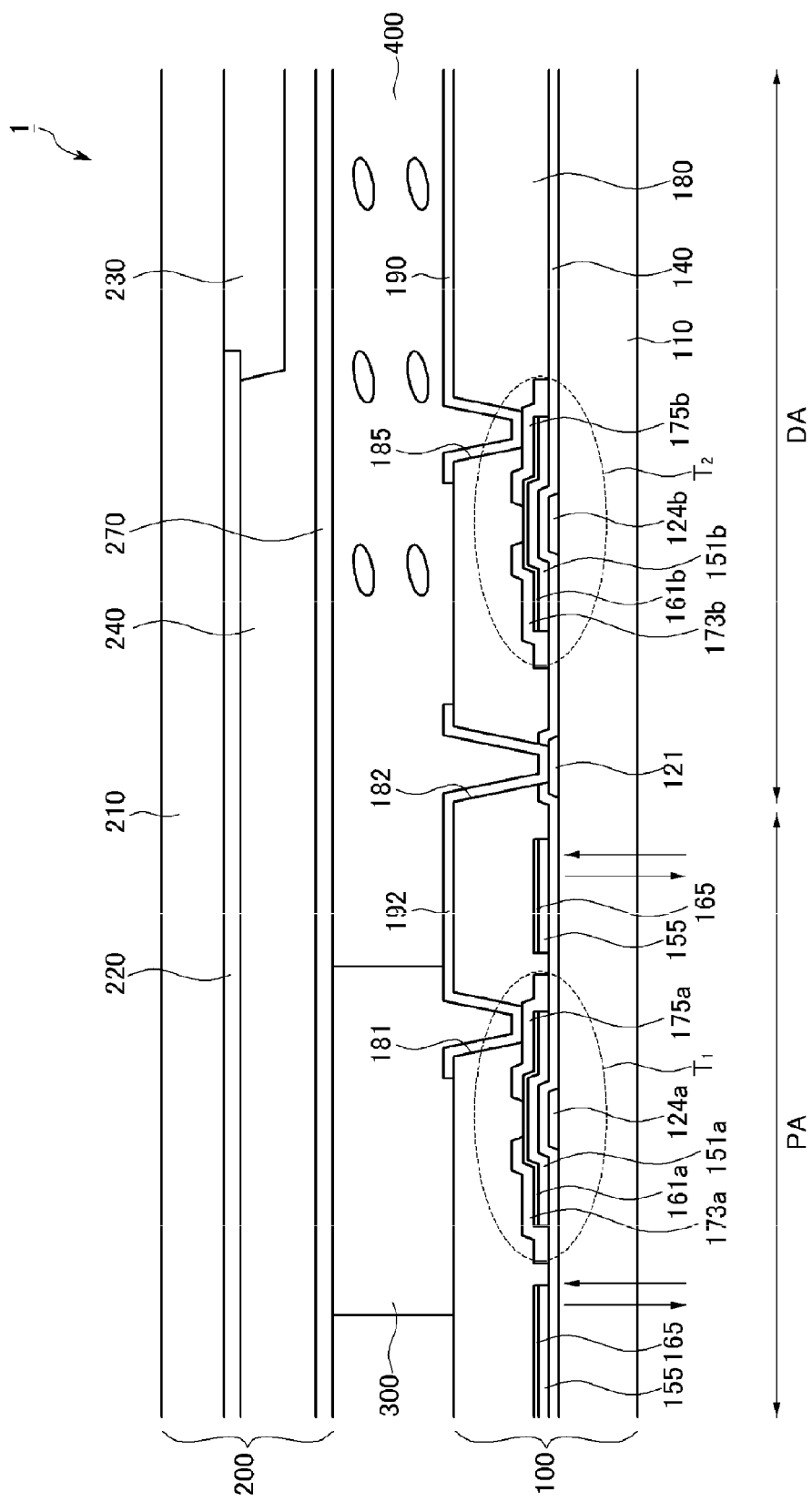
FIG. 1 is a cross-sectional view showing a display device in accordance with an exemplary embodiment of the present invention.

FIG. 1 is a cross-sectional view showing a display device in accordance with an exemplary embodiment of the present invention.

Referring to FIG. 1, a display device 1 includes a thin film transistor (TFT) substrate 100, a countering substrate 200 facing the TFT substrate 100, a sealant 300 interposed between the two substrates 100, 200 and formed along a peripheral area of the two substrates 100, 200, and a liquid crystal layer 400 having liquid crystal molecules, which are injected into an area defined by the sealant 300.

An alignment type of the liquid crystal layer 400 may be twisted nematic, vertical alignment, or electrically controlled birefringence.

Polarizers (not shown) may be attached on outside surfaces of the two substrates 100, 200, respectively. Transmissive axes of the polarizers can be substantially perpendicular to each other.

The TFT substrate 100 includes an insulating substrate 110 having a display area DA to display images and a peripheral area PA surrounding the display area. The insulating substrate 110 may have transparent glass.

The display area DA of the TFT substrate 100 includes a plurality of gate lines 121 and a gate electrode 124b. The peripheral area PA of the TFT substrate 100 includes a gate electrode 124a.

The plurality of gate lines 121 connect to the gate electrode 124b. A gate signal is applied to the gate electrode 124a.

The plurality of gate lines 121 and the gate electrodes 124a, 124b may include, for example, aluminum, an aluminum alloy, silver, a silver alloy, copper, a copper alloy, molybdenum, a molybdenum alloy, chromium, titanium, and/or tantalum. The plurality of gate lines 121 and the gate electrodes 124a, 124b may have a single layer or multiple layers. Each layer of a multiple layer configuration may include a different material. That is, the plurality of gate lines 121 and the gate electrodes 124a, 124b may have, for example, a lower layer (not shown) and an upper layer (not shown). For example, the upper layer of the plurality of gate lines 121 and the gate electrodes 124a, 124b may have a low resistivity metal to reduce signal delay and voltage drop. The upper layer may include, for example, aluminum or an aluminum alloy. The lower layer of the plurality of gate lines 121 and the gate electrodes 124a, 124b may have a material having good contact characteristics with indium tin oxide (ITO), or indium zinc oxide (IZO). The lower layer may include, for example, molybdenum, a molybdenum alloy, and/or chromium. The combination of the multiple layers may have, for example, a lower layer that includes chromium and an upper layer that includes aluminum-neodymium alloy.

A gate insulating layer 140 is formed on the gate lines 121 and the gate electrodes 124a, 124b. The gate insulating layer 140 may have, for example, a silicon nitride (SiNx).

Semiconductor layers 151a, 151b are formed on the gate insulating layer 140, respectively. The semiconductor layers may have, for example, hydrogenated amorphous silicon, and/or crystalline silicon.

A light blocking semiconductor pattern 155 is formed adjacent to the gate electrode 124a in the peripheral area PA and spaced apart from the semiconductor layer 151a. The light blocking semiconductor pattern 155 may have substantially the same material as a material of the semiconductor layer 151a.

The light blocking semiconductor pattern 155 can reflect or absorb light emitted from a backlight assembly disposed behind the TFT substrate 100, so that an amount of light passed through the TFT substrate 100 decreases.

Resistive contact members 161a, 161b are formed on the semiconductor layers 151a, 151b except for channel areas. The resistive contact members 161a, 161b may have, for example, silicide or n+ hydrogenated amorphous silicon doped with high density n-type impurities. The resistive contact members 161a, 161b may be formed between the semiconductor layers 151a, 151b, respectively, and the source and drain electrodes 173a, 173b, 175a, 175b. The resistive contact members 161a, 161b can reduce a contact resistance.

A resistive contact pattern 165 is formed on the light block semiconductor pattern 155 in the peripheral area PA. Furthermore, the resistive contact pattern 165 is formed on the same layer as a layer of the resistive contact members 161a, 161b, and may have substantially the same material as the material of the resistive contact members 161a, 161b. The resistive contact pattern 165 and the light blocking semiconductor pattern 155 can reflect or absorb light emitted from a backlight assembly disposed behind the TFT substrate 100, so that the efficiency of light blocking increases.

Source electrodes 173a, 173b branched from data lines (not shown) and drain electrodes 175a, 175b spaced apart from the source electrodes 173a, 173b are formed on the resistive contact members 161a, 161b and the gate insulating layer 140.

A driving TFT T1 may include the gate electrode 124a, the source electrode 173a, the drain electrode 175a and the semiconductor layer 151a in the peripheral area. A pixel TFT T2 may include the gate electrode 124b, the source electrode 173b, the drain electrode 175b and the semiconductor layer 151b in the display area.

The drain electrode 175a of the driving TFT T1 can be connected with gate lines 121 through a connection part 192. Thus, the driving TFT T1 applies a gate signal to the gate electrode 124b of the pixel TFT T2 through gate lines 121.

The source electrodes 173a, 173b and the drain electrodes 175a, 175b may include a refractory metal such as, for example, chromium, molybdenum, a molybdenum alloy, tantalum, and/or titanium. Furthermore, the source electrodes 173a, 173b and the drain electrodes 175a, 175b may include multiple layers which have, for example, two layers, such as a lower layer (not shown) and an upper layer (not shown). The lower layer may have, for example, molybdenum, a molybdenum alloy, and/or chromium. The upper layer may have, for example, aluminum or an aluminum alloy.

The source electrodes 173a, 173b and the drain electrodes 175a, 175b are spaced apart from the light blocking semiconductor pattern 155 and the resistive contact pattern 165 by a predetermined distance to avoid short-circuit.

A passivation layer 180 is formed on the source electrodes 173a, 173b, the drain electrodes 175a, 175b, the exposed semiconductor layer 151a, 151b and the resistive contact pattern 165. The passivation layer 180 may have, for example, an organic material having good planarization characteristics and photosensitivity, a low dielectric constant insulating material deposited by Plasma Enhanced Chemical Vapor Deposition (PECVD), such as a-Si:C:O, a-Si:O:F, and an inorganic material, such as, silicon nitride (SiNx). The passivation layer 180 may have a single layer or multiple layers. When the passivation layer 180 includes an organic material, an insulating layer (not shown) can be formed under the organic material to prevent the semiconductor layers 151a, 151b and the passivation layer 180 from being contacted. The insulating layer (not shown) may have, for example, silicon nitride (SiNx), and/or silicon oxide (SiO2).

The passivation layer 180 may have a first contact hole 181 to expose the drain electrode 175a of the driving TFT T1, a second contact hole 182 to expose the gate lines 121, and a third contact hole 185 to expose the drain electrode 175b of the pixel TFT T2.

A plurality of pixel electrodes 190 and a plurality of connection parts 192 are formed on the passivation layer 180. The plurality of pixel electrodes 190 may have, for example, indium tin oxide (ITO), and/or indium zinc oxide (IZO).

The pixel electrodes 190 are electrically connected with the drain electrode 175b of the pixel TFT T2 through the third contact hole 185. The connection part 192 connects the drain electrode 175a of the driving TFT T1 with the gate lines 121 through the first and second contact holes 181, 182.

When a gate signal is applied to the gate electrode 124a of the driving TFT T1, an electrical signal applied to the source electrode 173a is applied to the gate lines 121 through the drain electrode 175b and the connection part 192.

When a gate signal is applied to the gate electrode 124b of the pixel TFT T2, a driving signal is applied to the pixel electrodes 190 through the source electrode 173b and the drain electrode 175b. The pixel electrodes 190 receiving the driving signal generate an electric field with a common electrode 270, so that liquid crystal molecules of the liquid crystal layer 400 can be adjusted.

A countering substrate 200 facing the TFT substrate 100 includes an insulating substrate 210 having, for example, transparent glass and a black matrix 220 formed on the insulating substrate 210. The black matrix 220 may cover the driving TFT T1 and the pixel TFT T2, and prevent light leakage between the pixel electrodes 190. Furthermore, the black matrix 220 can define an open area facing the pixel electrodes 190.

Color filters 230 are formed on the insulating substrate 210 and the black matrix 220, and disposed substantially in the open area defined by the black matrix 220. The color filters 230 may include, for example, a red color filter, a green color filter, and/or a blue color filter.

An overcoat layer 240 is formed on the black matrix 220 and the color filter 230. The overcoat layer 240 can act as a planarization layer.

A common electrode 270 is formed on the overcoat layer 240. The common electrode may have a transparent conductive material, such as, for example, indium tin oxide (ITO) or indium zinc oxide (IZO). In an exemplary embodiment, the common electrode 270 can be formed on the black matrix 220 and the color filters 230.

A sealant 300 can couple the two substrates 100, 200, and can seal the liquid crystal layer 400 filled in the display area. The sealant 300 can cover the driving TFT T1, so that a portion of light which is emitted from a backlight assembly disposed behind the TFT substrate 100 and reflected from the countering substrate 200 can be absorbed. Thus, an amount of the light that is incident to the driving TFT T1 decreases.

A sealant 300 may be widely formed to cover at least a portion of the light blocking semiconductor pattern as well as the driving TFT T1. Therefore, light which is incident through peripheral area of the driving TFT T1 and reflected from the countering substrate 200 can be absorbed by the sealant 300. Accordingly, an amount of the light that is incident to the driving TFT T1 decreases.

According to an exemplary embodiment of the present invention, by forming the light blocking semiconductor pattern 155 and the resistive contact pattern 165 adjacent to the driving TFT T1, the light emitted from the backlight assembly can be prevented from being incident to the driving TFT T1. Thus, malfunction of the driving TFT T1 decreases.

The sealant 300 is formed to cover the driving TFT T1 so that the sealant 300 can absorb a portion of light emitted from the backlight assembly and reflected from the countering substrate 200. Therefore, the light incident to the driving TFT T1 decreases and malfunction of the driving TFT T1 also decreases.

FIG. 2a to FIG. 2e are cross-sectional views for showing a method of manufacturing a display device in accordance with an exemplary embodiment of the present invention.

Referring to FIG. 2a, an insulating substrate 110 having a display area DA to display an image and a peripheral area PA surrounding the display area DA is formed. A first gate electrode 124a in the peripheral area PA and gate lines 121 and a second gate electrode 124b connected with the gate lines 121 are formed on the insulating substrate 110.

The gate lines 121 and the gate electrodes 124a, 124b may be formed, for example, by a sputtering process and a photolithography process. The gate lines 121 and the gate electrodes 124a, 124b can include a conductive layer which is, for example, aluminum, an aluminum alloy, silver, a silver alloy, copper, a copper alloy, molybdenum, a molybdenum alloy, chromium, titanium, and/or tantalum.

A gate insulating layer 140, a hydrogenated amorphous silicon layer and a resistive contact member are consecutively formed on the gate lines 121 and the gate electrodes 124a, 124b and cover the gate lines 121 and the gate electrodes 124a, 124b. The gate insulating layer 140, the hydrogenated amorphous silicon layer and the resistive contact member are formed by, for example, low temperature chemical vapor deposition (LTCVD) or plasma enhanced chemical vapor deposition (PECVD).

Referring to FIG. 2a, by patterning the hydrogenated amorphous silicon layer and a doped (N+) amorphous silicon layer, first semiconductor layers 151a, 151b and resistive contact members 161a, 161b are formed on the gate electrodes 124a, 124b. A light blocking semiconductor pattern 155 and a resistive contact pattern 165 are formed in the peripheral area and spaced apart from the first semiconductor layer 151a and the first resistive contact member 161a.

Then, a conductive layer can be deposited through a sputtering method. The conductive layer may include a refractory metal such as, for example, chromium, molybdenum, tantalum, and/or titanium.

Figure 2B:
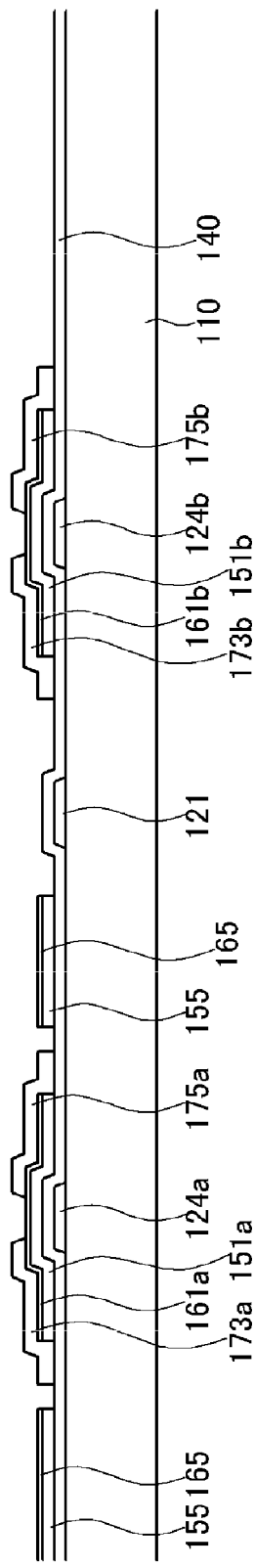

Referring to FIG. 2b, source electrodes 173a, 173b and drain electrodes 175a, 175b are formed on the resistive contact members 161a, 161b, respectively, by patterning the conductive layer through a photolithography process.

The first source electrode 173a and the first drain electrode 175a are spaced apart from the light blocking semiconductor pattern 155 and the resistive contact pattern 165 to prevent short-circuit.

A portion of the resistive contact member 161a, 161b that is not covered by the source electrodes 173a, 173b and the drain electrodes 175a, 175b is patterned. Thus, the semiconductor layers 151a, 151b disposed between the separated resistive contact members 161a, 161b are exposed. In an embodiment, an oxygen plasma process can be implemented to the exposed semiconductor layers 151a, 151b.

Figure 2C:
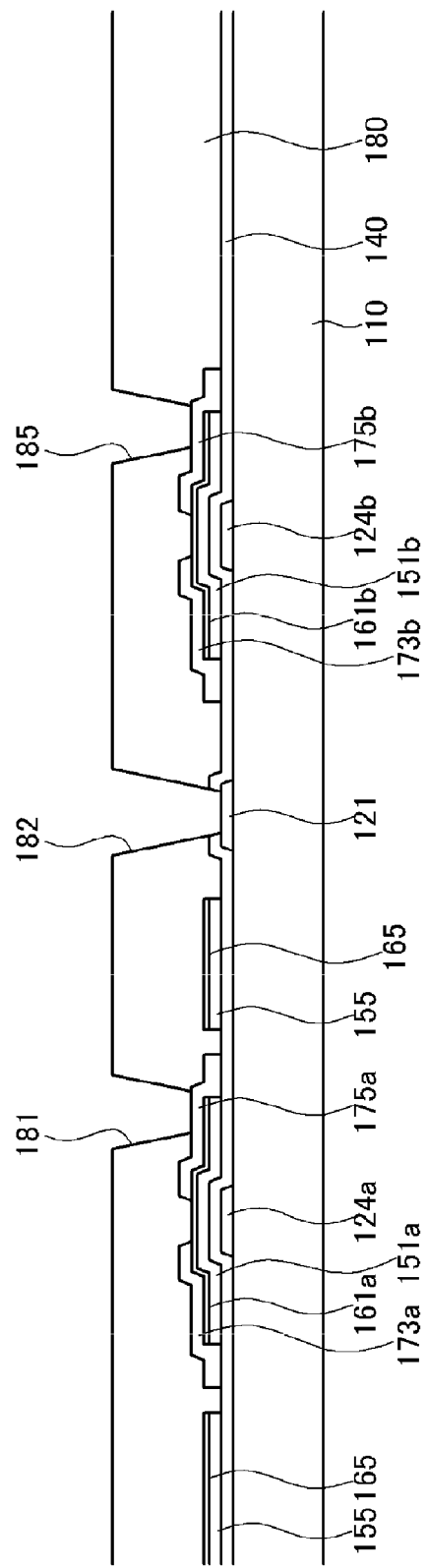

Referring to FIG. 2c, a passivation layer 180 is formed by depositing an organic insulating material or an inorganic insulating material. Then, a plurality of contact holes 181, 182, 185 are formed through a photolithography process. Each of the contact holes 181, 182, 185 exposes the first and second drain electrodes 175a, 175b and a portion of the gate lines 121. The second contact hole 182 can expose the gate insulating layer 140 under the passivation layer 180 through a photolithography process.

Figure 2D:
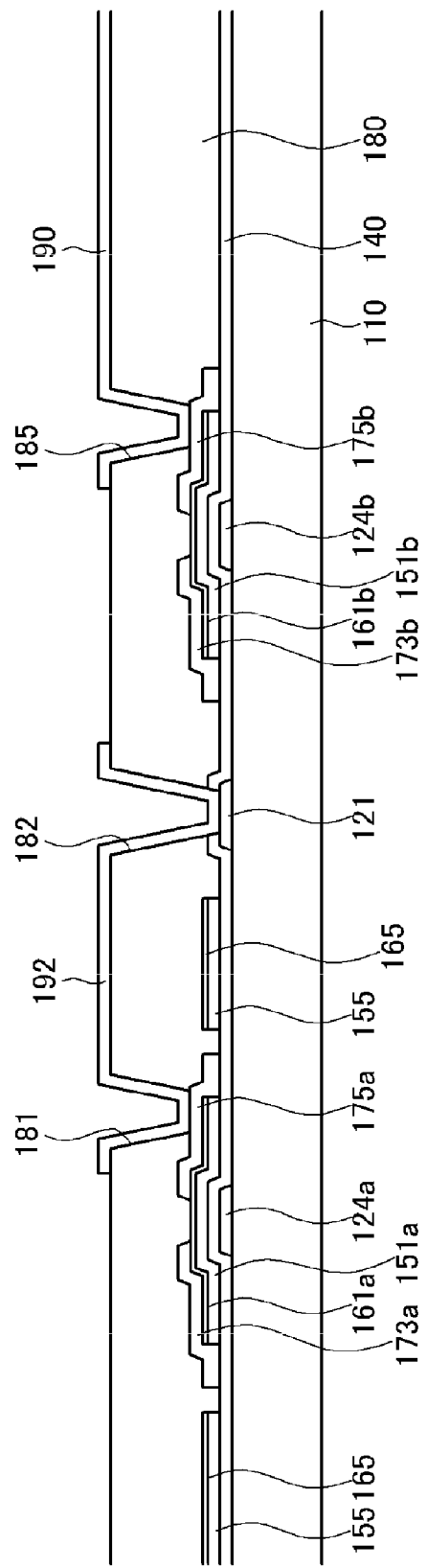

Referring to FIG. 2d, a pixel electrode 190 and a connection part 192 are formed on the passivation layer. The pixel electrode 190 and the connection part 192 may include, for example, indium tin oxide (ITO), and/or indium zinc oxide (IZO).

Figure 2E:
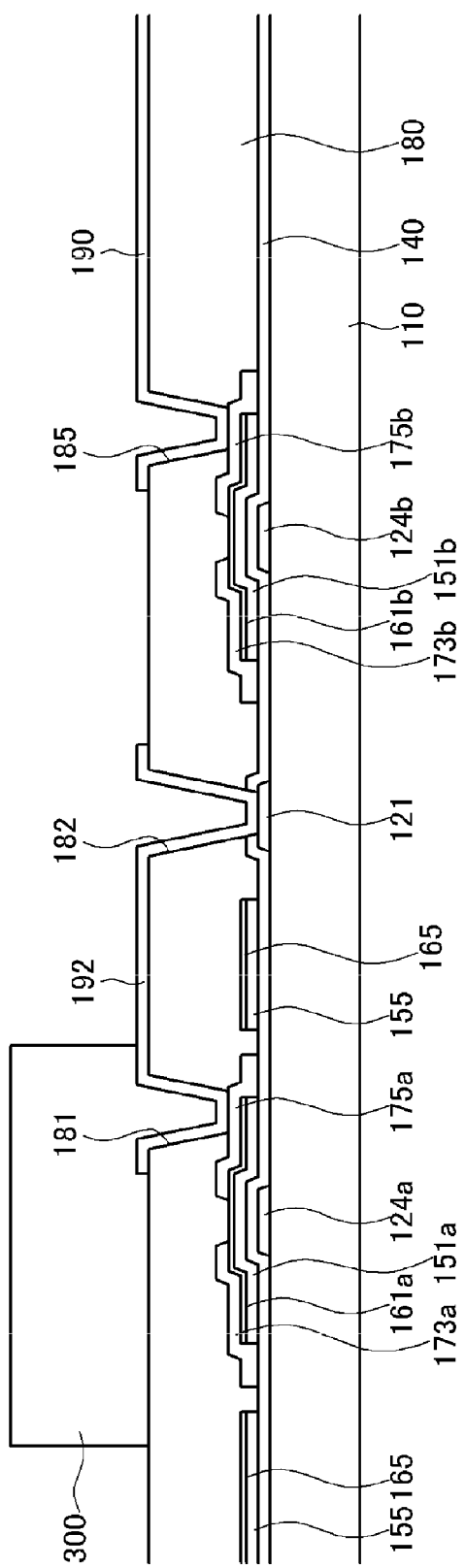

Referring to FIG. 2e, a sealant 300 is applied along the peripheral area of the TFT substrate 100 to cover the driving TFT T1. The sealant 300 may include, for example, liquid phase sealant or gel type sealant. The sealant 300 may be widely applied along the peripheral area so as to cover at least a portion of the light blocking semiconductor pattern as well as to the driving TFT T1.

Then, the sealant 300 is hardened to couple the TFT substrate 100 with the countering substrate 200.

A liquid crystal layer 400 is injected into an area defined by the sealant 300 and the two substrates 100, 200.

Figure 3:
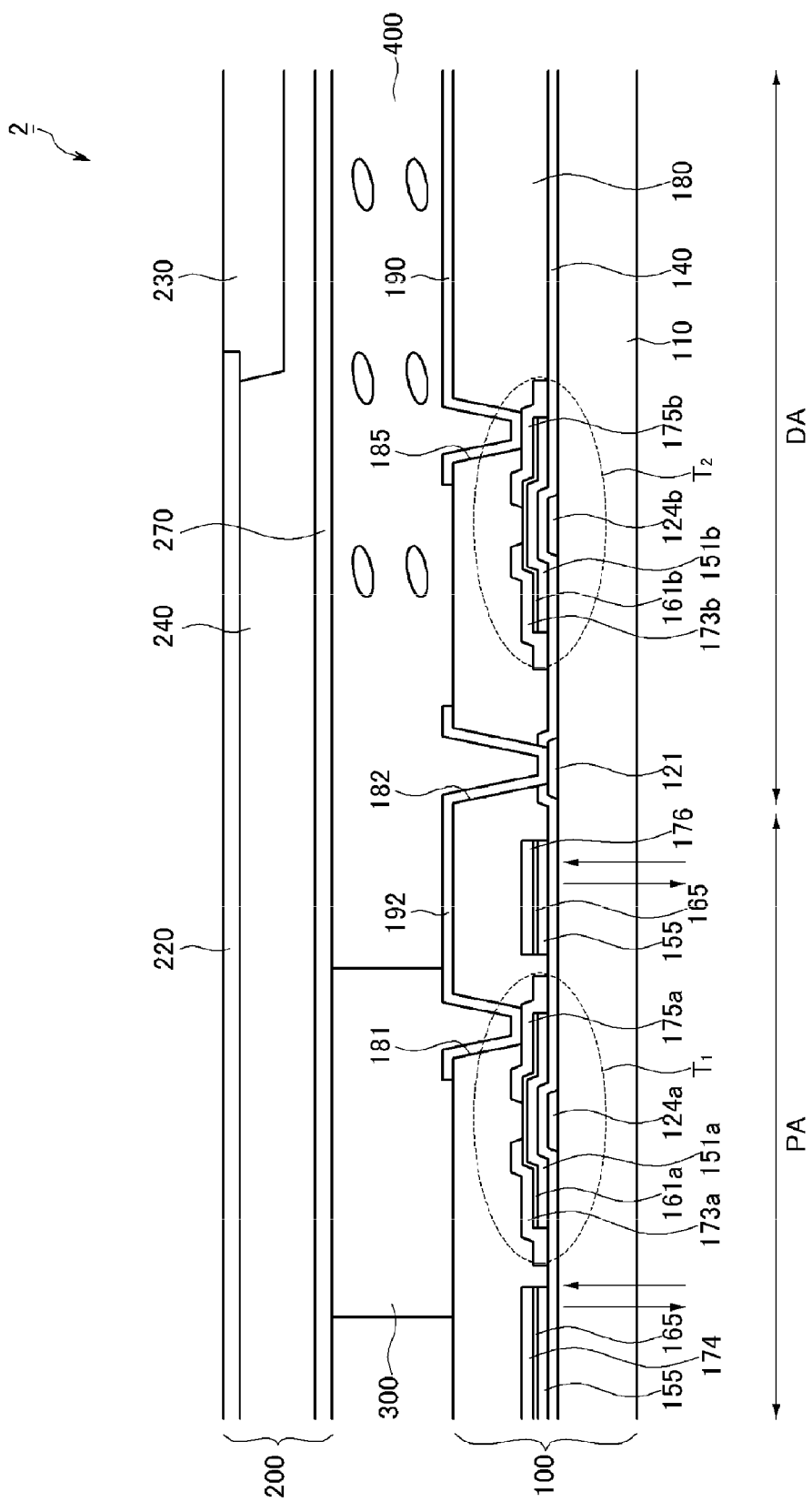
FIG. 3 is a cross-sectional view showing a display device in accordance with an exemplary embodiment of the present invention.

FIG. 3 is a cross-sectional view showing a display device in accordance with an exemplary embodiment of the present invention.

Referring to FIG. 3, a light blocking metal layer 174 is formed on the resistive contact pattern 165 of the TFT substrate 101. When the source electrodes 173a, 173b and the drain electrodes 175a, 175b are formed on the resistive contact member 161a, 161b, the light blocking metal layer 174 is formed simultaneously with the source electrodes 173a, 173b and the drain electrodes 175a, 175b.

By forming the light blocking metal layer 174 on the resistive contact pattern 165, an efficiency of light blocking can be improved.

Although exemplary embodiments of the present invention have been described herein with reference to the accompanying drawings, it is to be understood that the present invention should not be limited to those precise embodiments and that various other changes and modifications may be made by one of ordinary skill in the related art without departing from the scope or spirit of the invention. All such changes and modifications are intended to be included within the scope of the invention as defined by the appended claims.

What is claimed is:

1. A display device comprising:
   a thin film transistor (TFT) substrate having a display area and a peripheral area surrounding the display area, wherein the TFT substrate comprises:
   a substrate;
   a first TFT formed in the peripheral area, the first TFT including a semiconductor layer and a resistive contact member formed on the semiconductor layer;
   a light blocking semiconductor pattern formed adjacent to the first TFT; and
   a second TFT formed in the display area and including a gate electrode;
   wherein, the light blocking semiconductor pattern is formed in a shape of an island and disposed on the same layer as the semiconductor layer.

2. The display device of claim 1, wherein the light blocking semiconductor pattern is formed between the first TFT and the second TFT.

3. The display device of claim 2, further comprising a resistive contact pattern formed on the light blocking semiconductor pattern, wherein the resistive contact pattern is formed from the same layer as the resistive contact pattern.

4. The display device of claim 3, wherein the light blocking semiconductor pattern comprises at least one of hydrogenated amorphous silicon or crystalline silicon.

5. The display device of claim 1, wherein the light blocking semiconductor pattern is formed in an opposite side to the second TFT with the first TFT being therebetween.

6. The display device of claim 5, further comprising a resistive contact pattern formed on the light blocking semiconductor pattern, wherein the resistive contact pattern is formed from the same layer as the resistive contact pattern.

7. The display device of claim 6, wherein the light blocking semiconductor pattern comprises at least one of hydrogenated amorphous silicon or crystalline silicon.

8. The display device of claim 6, further comprising:
   a countering substrate;
   a sealant coupling the TFT substrate to the countering substrate; and
   a liquid crystal layer interposed between the TFT substrate and the coupling substrate,
   wherein the sealant covers at least a portion of the light blocking semiconductor pattern.

9. The display device of claim 1, wherein the light blocking semiconductor pattern is formed in an opposite side to the second TFT with the first TFT being therebetween, and between the first and the second TFTs.

10. The display device of claim 9, further comprising a resistive contact pattern formed on the light blocking semiconductor pattern, wherein the resistive contact pattern is formed from the same layer as the resistive contact pattern.

11. The display device of claim 10, wherein the light blocking semiconductor pattern comprises at least one of hydrogenated amorphous silicon or crystalline silicon.

12. The display device of claim 11, further comprising:
   a countering substrate;
   a sealant coupling the TFT substrate to the countering substrate; and
   a liquid crystal layer interposed between the TFT substrate and the coupling substrate,
   wherein the sealant covers at least a portion of the light blocking semiconductor pattern.

* * * * *